(12) United States Patent
Smith (10) Patent No.: US 9,490,619 B2
(45) Date of Patent: Nov. 8, 2016

(54) PUSH-ON LIQUIDTIGHT CONDUIT FITTING

(71) Applicant: Bridgeport Fittings, Inc., Stratford, CT (US)

(72) Inventor: Lawrence J. Smith, Stamford, CT (US)

(73) Assignee: Bridgeport Fittings, Inc., Stratford, CT (US)

( * ) Notice: Subject to any disclaimer, the term of this patent is extended or adjusted under 35 U.S.C. 154(b) by 836 days.

(21) Appl. No.: 13/660,288

(22) Filed: Oct. 25, 2012

(65) Prior Publication Data

US 2014/0117660 A1     May 1, 2014

(51) Int. Cl.
*H02G 3/08*     (2006.01)

(52) U.S. Cl.
CPC .............. *H02G 3/088* (2013.01); *H02G 3/083* (2013.01)

(58) Field of Classification Search
CPC .... H02G 3/0616; H02G 3/088; H02G 3/083; F16L 37/091; F16L 15/06
USPC ................ 285/151.1, 141.1, 149.1, 331, 319
See application file for complete search history.

(56) References Cited

U.S. PATENT DOCUMENTS

| | | |
|---|---|---|
| 2,295,820 A | 9/1942 | Carlson |
| 2,821,567 A | 1/1958 | Bergan |
| 3,659,880 A | 5/1972 | Goldsobel |
| 3,966,238 A | 6/1976 | Washkewicz et al. |
| 4,133,312 A | 1/1979 | Burd |
| 4,169,967 A | 10/1979 | Bachle |
| 4,188,051 A | 2/1980 | Burge |
| 4,224,464 A | 9/1980 | Bunnell et al. |
| 4,225,162 A | 9/1980 | Dola |
| 4,335,908 A | 6/1982 | Burge |
| 4,457,544 A | 7/1984 | Snow et al. |
| 4,652,018 A | 3/1987 | Boghosian |
| 4,685,706 A | 8/1987 | Kowal et al. |
| 4,842,548 A | 6/1989 | Bolante |
| 4,850,620 A | 7/1989 | Puls |
| 4,900,068 A | 2/1990 | Law |
| 5,068,496 A | 11/1991 | Favalora |
| 5,072,072 A | 12/1991 | Bawa et al. |
| 5,087,795 A | 2/1992 | Guginsky |
| 5,204,499 A | 4/1993 | Favalora |
| 5,266,050 A | 11/1993 | O'Neil et al. |
| 5,545,854 A | 8/1996 | Ishida |
| 5,593,186 A | 1/1997 | Harris |
| 5,831,217 A | 11/1998 | Jarvis et al. |
| 5,857,865 A | 1/1999 | Shimirak et al. |
| 6,044,868 A | 4/2000 | Gretz et al. |
| 6,053,749 A | 4/2000 | Masuda et al. |

(Continued)

*Primary Examiner* — Daniel P Stodola
*Assistant Examiner* — Zachary Dragicevich
(74) *Attorney, Agent, or Firm* — Ware, Fressola, Maguire & Barber LLP (57) ABSTRACT

A liquidtight conduit fitting has a body with an end wall with an opening formed therein; a hollow threaded nipple attached to the end wall, for passage into an electrical box, the body having an outer shell extending from the end wall in a direction opposite the nipple, the outer shell defining an open-ended chamber; a ferrule positioned within the outer shell, a foam gasket positioned within the open-ended chamber adjacent the end wall and around the ferrule, and a conduit locking device having tabs protruding inwardly toward the outer surface of the ferrule so as to contact a conduit positioned around the ferrule, terminating ends of the tabs forming a helical-type pattern so that a conduit positioned around the ferrule is securely held in place by the tabs and so that the conduit can be removed from the conduit fitting by rotating the conduit fitting relative to the conduit.

32 Claims, 9 Drawing Sheets

(56) References Cited

U.S. PATENT DOCUMENTS

| | | |
|---|---|---|
| 6,080,933 A | 6/2000 | Gretz |
| 6,102,442 A | 8/2000 | Gretz |
| 6,114,630 A | 9/2000 | Gretz |
| 6,133,529 A | 10/2000 | Gretz |
| 6,162,995 A | 12/2000 | Bachle et al. |
| 6,180,882 B1 | 1/2001 | Dinh |
| 6,184,467 B1 | 2/2001 | Milanowski et al. |
| 6,211,465 B1 | 4/2001 | Streit |
| 6,248,952 B1 | 6/2001 | Reeves et al. |
| 6,372,986 B1 | 4/2002 | Saeki et al. |
| 6,498,295 B1 | 12/2002 | Akiyama et al. |
| 6,538,201 B1 * | 3/2003 | Gretz ............................ 174/655 |
| 6,616,194 B1 | 9/2003 | Gretz |
| 6,642,451 B1 | 11/2003 | Gretz |
| 6,767,032 B1 | 7/2004 | Gretz |
| 6,780,029 B1 * | 8/2004 | Gretz ............................ 439/92 |
| 6,935,890 B1 | 8/2005 | Gretz |
| 7,048,561 B1 | 5/2006 | Elbaz |
| 7,429,064 B2 | 9/2008 | Topolsek et al. |
| 7,841,630 B1 | 11/2010 | Auray et al. |
| 2009/0140514 A1 * | 6/2009 | Guest .................. F16L 37/0925 285/24 |
| 2011/0089684 A1 * | 4/2011 | Schutte et al. ................ 285/305 |

* cited by examiner

PUSH-ON LIQUIDTIGHT CONDUIT FITTING

TECHNICAL FIELD

The present invention relates to conduit fittings and in particular to liquidtight conduit fittings for non-metallic liquidtight flexible electrical conduit.

BACKGROUND OF THE INVENTION

Conduit fittings are known in the art for fitting non-metallic liquidtight flexible electrical conduit to an opening in an electrical box or other electrical enclosure. For some applications, it is desirable that the conduit fitting be liquidtight, meaning that it will effectively prevent water entry into the electrical box or other electrical enclosure even when streaming water is directed at the conduit fitting and electrical box. Some of the prior art liquidtight conduit fittings comprise multiple components where tightening or other manual operations are required in order to properly affix a conduit to the conduit fitting in a manner that maintains a liquidtight connection.

SUMMARY OF THE INVENTION

The present invention provides a liquidtight conduit fitting which is easy to install to an electrical box and which allows for push-on securement of a non-metallic liquidtight flexible electrical conduit, as well as easy removal of the electrical conduit from the fitting without the need for disassembling the fitting.

A liquidtight conduit fitting according to the present invention in an embodiment thereof has a construction that allows for easy attachment to an electrical box or other electrical enclosure through a knockout opening therein. Once the conduit fitting is affixed to the electrical box, a non-metallic liquidtight flexible electrical conduit, including the wires therein, are easily passed through the conduit fitting for termination within the electrical box and the conduit itself is secured to the conduit fitting in a manner that provides a liquidtight connection. Furthermore, if the conduit needs to be removed from the conduit fitting, this can be easily achieved without disassembling the conduit fitting. Removal of the electrical conduit only requires unscrewing the conduit fitting relative to the electrical conduit.

An embodiment of the present invention is a liquidtight conduit fitting comprising a body having an end wall with an opening formed therein; a hollow nipple attached to the end wall around said opening and extending from the end wall of the body, said nipple threaded for threaded engagement with a locknut and the nipple dimensioned for passage of a sealing washer so that the sealing washer can contact the end wall of the body, the nipple dimensioned for passage within an aperture of an electrical box and the end wall dimensioned for contacting a perimeter of the electrical box about said aperture, the body having an outer shell extending from said end wall in a direction opposite an extending direction of said nipple, the outer shell defining an open-ended chamber; a ferrule positioned within the outer shell, the ferrule attached to the end wall of the body on a side opposite said hollow nipple, the ferrule having an outer surface dimensioned for receipt of a conduit; a foam gasket positioned within the open-ended chamber adjacent the end wall and around the ferrule; and a conduit locking device attached to the outer shell and extending within the open-ended chamber, the conduit locking device having a plurality of tabs each protruding inwardly toward the outer surface of the ferrule so as to contact at a terminating end of the tab a conduit positioned around the ferrule, the terminating end of each tab positioned within the outer shell in a configuration that substantially defines a helix so that a conduit positioned around the ferrule and having an end thereof in sealing contact with the foam gasket is securely held in place by said tabs and so that the conduit can be removed from the conduit fitting by rotating the conduit fitting relative to said conduit.

Another embodiment of the present invention is the liquidtight conduit fitting as described above, wherein the conduit locking device is sonically welded to the outer shell of the conduit fitting.

A further embodiment of the present invention is the liquidtight conduit fitting as described above, wherein the body, nipple, ferrule and conduit locking device are fabricated from polyvinyl chloride.

A still further embodiment of the present invention is the liquidtight conduit fitting as described above, wherein the conduit locking device includes a cylindrical wall portion depending from an end of the conduit locking device so as to extend within the open-ended chamber of the outer shell, the cylindrical wall including a plurality of cutouts, where each cutout has one of the plurality of tabs positioned therein.

Another embodiment of the present invention is the liquidtight conduit fitting as described above, wherein the plurality of tabs and the plurality of cutouts are each equal to four.

A further embodiment of the present invention is the liquidtight conduit fitting as described above, wherein the plurality of tabs have terminating ends with corners that are relieved.

A still further embodiment of the present invention is the liquidtight conduit fitting as described above, wherein the plurality of tabs have terminating ends with corners that are relieved.

A further embodiment of the present invention is the liquidtight conduit fitting as described above, wherein the terminating ends of the tabs are angled so as to substantially correspond to said helix.

A still further embodiment of the present invention is the liquidtight conduit fitting as described above, wherein the terminating ends of the tabs are angled so as to substantially correspond to said helix.

Another embodiment of the present invention is the liquidtight conduit fitting as described above, wherein the end wall includes a shoulder dimensioned for receipt of the sealing washer so as to limit compression of the sealing washer when the locknut is tightened during installing of the conduit fitting through the aperture of the electrical box.

A still further embodiment of the present invention is the liquidtight conduit fitting as described above, wherein the conduit is a liquidtight non-metallic flexible electrical conduit.

Another embodiment of the present invention is a liquidtight conduit fitting comprising a body having an end wall with an opening formed therein; the body having an outer shell extending from said end wall, the outer shell defining an open-ended chamber; a ferrule positioned within the outer shell and attached to the end wall of the body, the ferrule having an outer surface dimensioned for receipt of a conduit; a foam gasket positioned within the open-ended chamber adjacent the end wall and around the ferrule; a hollow nipple attached to a flange, wherein the flange is dimensioned for contacting a perimeter of the electrical box about an aperture of the electrical box, said nipple threaded for threaded engagement with a locknut and the nipple dimensioned for passage of a sealing washer; a hollow elbow member sealingly attached at one end to the flange and sealingly attached to the end wall at a second end of the elbow; and a conduit locking device attached to the outer shell and extending within the open-ended chamber, the conduit locking device having a plurality of tabs each protruding inwardly toward the outer surface of the ferrule so as to contact at a terminating end of the tab a conduit positioned around the ferrule, the terminating end of each tab positioned within the outer shell in a configuration that substantially defines a helix so that a conduit positioned around the ferrule and having an end thereof in sealing contact with the foam gasket is securely held in place by said tabs and so that the conduit can be removed from the conduit fitting by rotating the conduit fitting relative to said conduit.

A further embodiment of the present invention is the liquidtight conduit fitting as described above, wherein the conduit locking device is sonically welded to the outer shell of the conduit fitting.

A still further embodiment of the present invention is the liquidtight conduit fitting as described above, wherein the body, nipple, ferrule, elbow member and conduit locking device are fabricated from polyvinyl chloride.

Another embodiment of the present invention is the liquidtight conduit fitting as described above, wherein the conduit locking device includes a cylindrical wall portion depending from an end of the conduit locking device so as to extend within the open-ended chamber of the outer shell, the cylindrical wall including a plurality of cutouts where each cutout has one of the plurality of tabs positioned therein.

A further embodiment of the present invention is the liquidtight conduit fitting as described above, wherein the plurality of tabs and the plurality of cutouts are each equal to four.

Another embodiment of the present invention is the liquidtight conduit fitting as described above, wherein the plurality of tabs have terminating ends with corners that are relieved.

A still further embodiment of the present invention is the liquidtight conduit fitting as described above, wherein the terminating ends of the tabs are angled so as to substantially correspond to said helix.

Another embodiment of the present invention is the liquidtight conduit fitting as described above, wherein the terminating ends of the tabs are angled so as to substantially correspond to said helix.

A further embodiment of the present invention is the liquidtight conduit fitting as described above, wherein the plurality of tabs have terminating ends with corners that are relieved.

A further embodiment of the present invention is the liquidtight conduit fitting as described above, wherein the flange includes a shoulder dimensioned for receipt of the sealing washer so as to limit compression of the sealing washer when the locknut is tightened during installing of the conduit fitting through the aperture of the electrical box.

A still further embodiment of the present invention is the liquidtight conduit fitting as described above, wherein the conduit is a liquidtight non-metallic flexible electrical conduit.

Another embodiment of the present invention is a liquidtight conduit fitting comprising a body having an end wall with an opening formed therein; a hollow nipple attached to the end wall around said opening and extending from the end wall of the body, said nipple threaded for threaded engagement with a locknut and the nipple dimensioned for passage of a sealing washer so that the sealing washer can contact the end wall of the body, the nipple dimensioned for passage within an aperture of an electrical box and the end wall dimensioned for contacting a perimeter of the electrical box about said aperture, the body having an outer shell extending from said end wall in a direction opposite an extending direction of said nipple, the outer shell defining an open-ended chamber; a ferrule positioned within the outer shell, the ferrule attached to the end wall of the body on a side opposite said hollow nipple, the ferrule having an outer surface dimensioned for receipt of a conduit; a foam gasket positioned within the open-ended chamber adjacent the end wall and around the ferrule; and a conduit locking device attached to the outer shell and extending within the open-ended chamber, the conduit locking device having a cylindrical wall portion depending from the flange so as to extend within the open-ended chamber of the outer shell, the cylindrical wall including a plurality of cutouts, and a plurality of tabs each positioned within one of the cutouts, each tab protruding inwardly toward the outer surface of the ferrule so as to contact at a terminating end of the tab a conduit positioned around the ferrule, the terminating end of each tab positioned within the outer shell in a configuration that substantially defines a helix so that a conduit positioned around the ferrule and having an end thereof in sealing contact with the foam gasket is securely held in place by said tabs and so that the conduit can be removed from the conduit fitting by rotating the conduit fitting relative to said conduit.

A further embodiment of the present invention is the liquidtight conduit fitting as described above, wherein the flange of the conduit locking device is sonically welded to the outer shell of the conduit fitting.

A still further embodiment of the present invention is the liquidtight conduit fitting as described above, wherein the body, nipple, ferrule and conduit locking device are fabricated from polyvinyl chloride.

A further embodiment of the present invention is the liquidtight conduit fitting as described above, wherein the plurality of tabs and the plurality of cutouts are each equal to four.

Another embodiment of the present invention is the liquidtight conduit fitting as described above, wherein the plurality of tabs have terminating ends with corners that are relieved.

A further embodiment of the present invention is the liquidtight conduit fitting as described above, wherein the plurality of tabs have terminating ends with corners that are relieved.

A still further embodiment of the present invention is the liquidtight conduit fitting as described above, wherein the terminating ends of the tabs are angled so as to substantially correspond to said helix.

Another embodiment of the present invention is the liquidtight conduit fitting as described above, wherein the end wall includes a shoulder dimensioned for receipt of the sealing washer so as to limit compression of the sealing washer when the locknut is tightened during installing of the conduit fitting through the aperture of the electrical box.

Another embodiment of the present invention is the liquidtight conduit fitting as described above, wherein the hollow nipple is attached to a flange, wherein the flange that the nipple is attached to is dimensioned for contacting the perimeter of the electrical box about said aperture, and wherein the liquidtight conduit fitting further comprises a hollow elbow member sealingly attached at one end to the flange and sealingly attached to the end wall at a second end of the elbow.

A further embodiment of the present invention is the liquidtight conduit fitting as described above, wherein the conduit is a liquidtight non-metallic flexible electrical conduit.

BRIEF DESCRIPTION OF THE DRAWINGS

For a fuller understanding of the nature and objects of the present invention, reference is made to the following detailed description taken in conjunction with the following drawings in which:

FIG. 1F is an enlarged cross-sectional view of a flange of the conduit locking device taken along line 1F-1F of FIG. 1.

DETAILED DESCRIPTION

Figure 1:
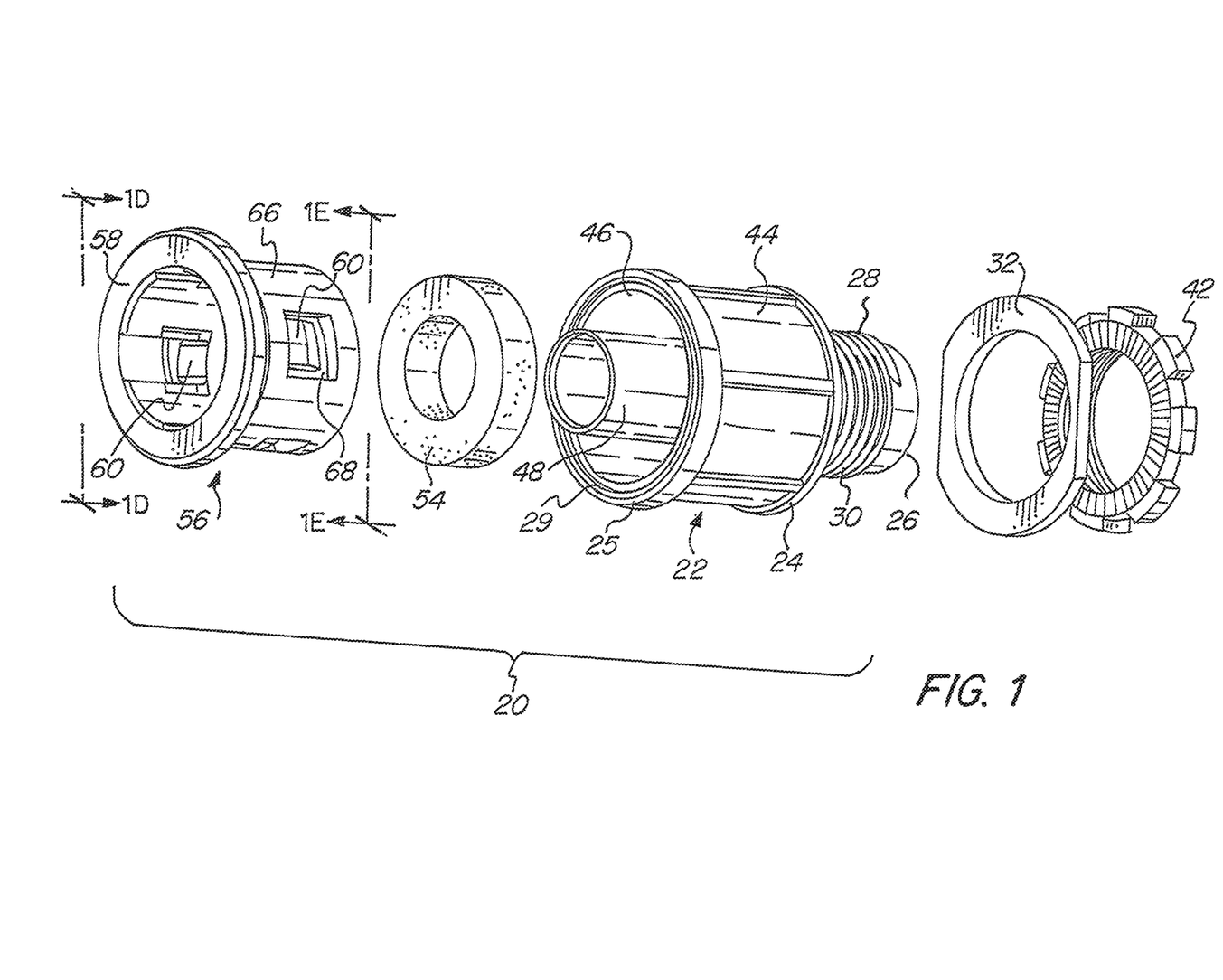
FIG. 1 is an exploded perspective view of an embodiment of a liquidtight conduit fitting according to the present invention in which a nipple of the conduit fitting extends directly from a body of the conduit fitting.
Figures 2, 3:
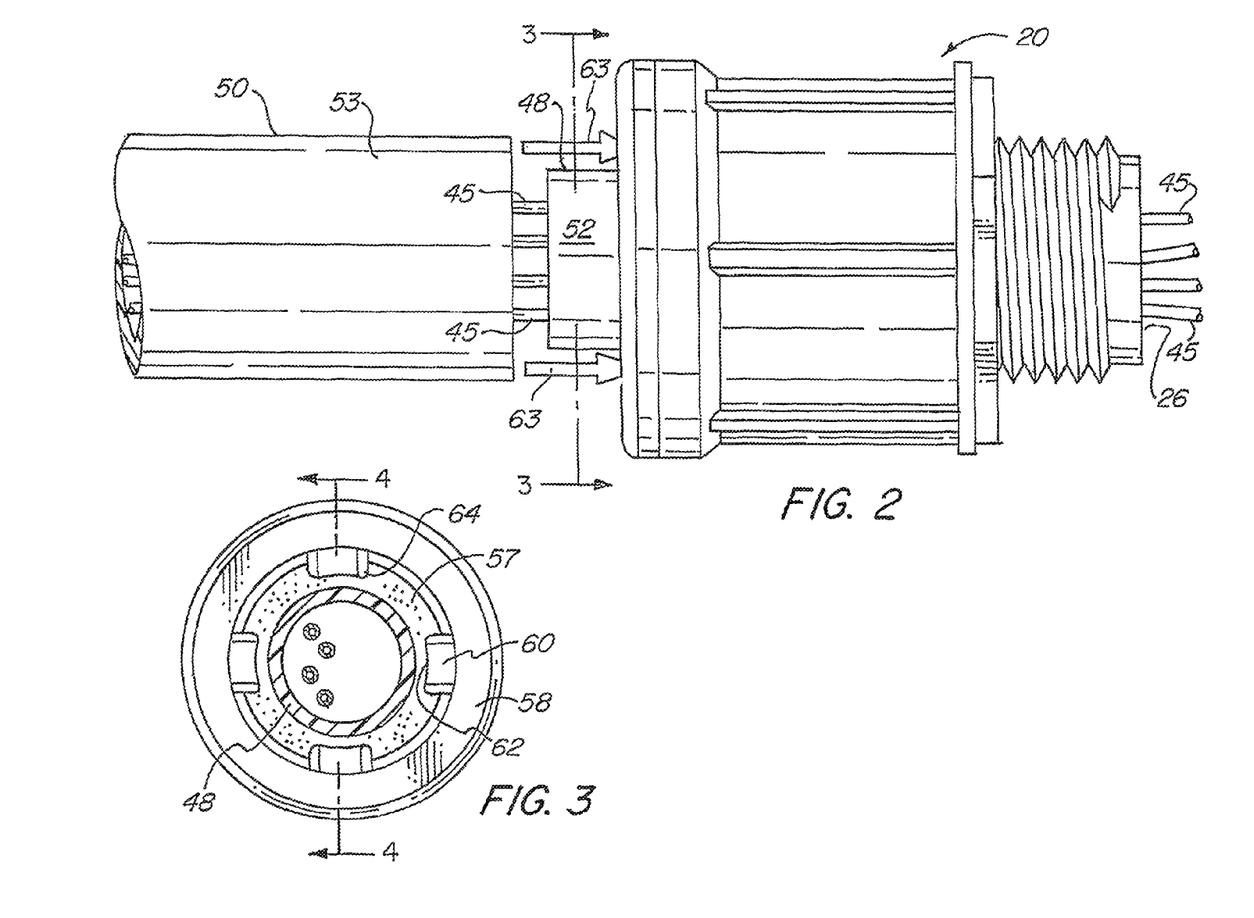
FIG. 2 is a side view of the liquidtight conduit fitting shown in FIG. 1.
FIG. 3 is an end view of the liquidtight conduit fitting taken along line 3-3 of FIG. 2.

FIG. 1 illustrates an embodiment of a liquidtight conduit fitting 20 according to the present invention. As there seen, the conduit fitting includes a body 22. The body 22 has an end wall 24 having an opening 26 formed therein as best seen in FIG. 2. This opening is centrally located within the end wall. The end wall includes a shoulder 27 dimensioned for receipt of a knockout sealing washer 32. If desired, the knockout sealing washer could be captured around the shoulder.

Figure 4:
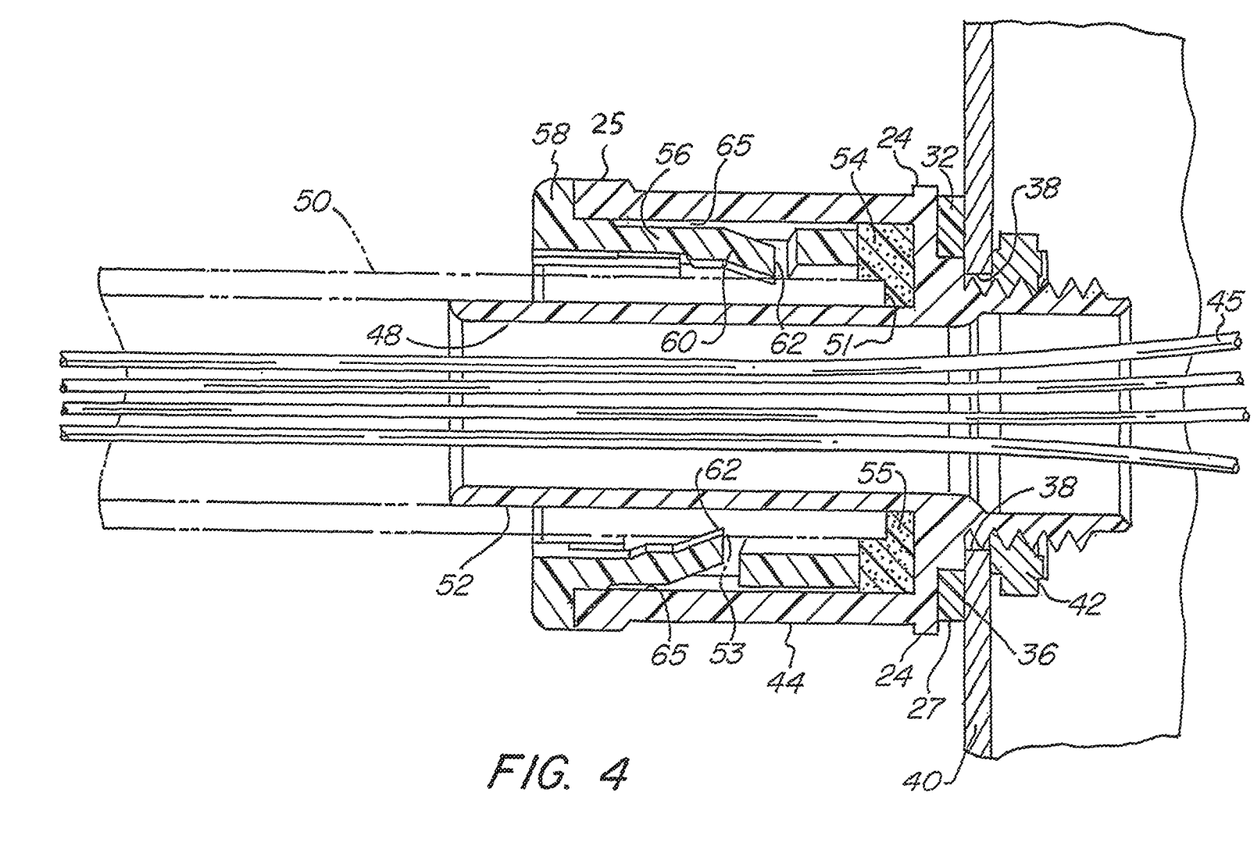
FIG. 4 is a cross-sectional view of the liquidtight conduit fitting shown in FIG. 1 attached to an electrical box and with an electrical conduit secured thereto.
Figure 5:
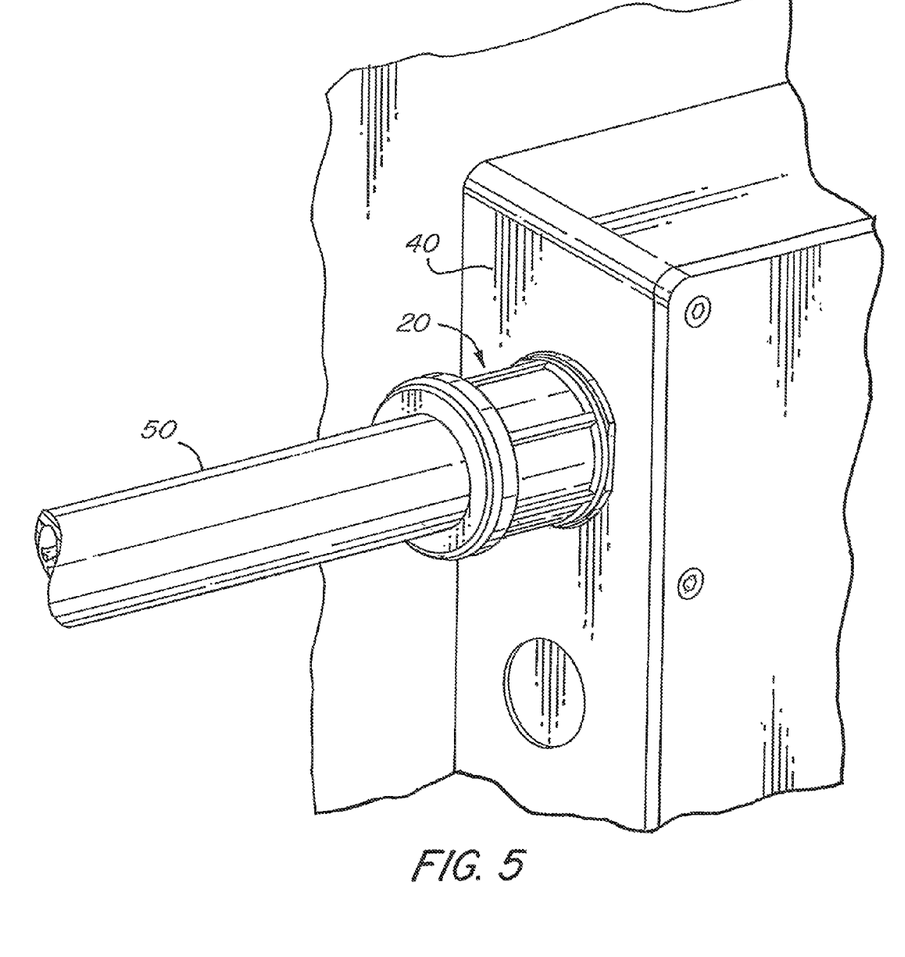
FIG. 5 is a perspective view of the liquidtight conduit fitting, electrical box and electrical conduit shown in FIG. 4.

Extending from the end wall is a nipple 28 having threads 30 formed thereon. As best seen in FIGS. 1 and 4, the sealing washer 32 is positioned in shoulder 27 so that the sealing washer makes intimate contact between the end wall and a region 36 positioned about an aperture 38 formed in the electrical box 40 when a knockout (not shown) is removed. The height of the shoulder is slightly less than the thickness of the sealing washer, which thereby prevents the sealing washer from being over compressed when locknut 42 is tightened so as to secure the conduit fitting body to an electrical box 40 in a liquidtight fashion (see FIG. 4). The locknut 42 secures the conduit fitting to the electrical box by threaded engagement of the locknut with threads 30 of nipple 28.

Body 22 also has an outer shell 44 extending from end wall 24 in a direction opposite that of nipple 28. The outer shell defines an open ended chamber 46. A ferrule 48 is positioned within the outer shell 44 of body 22 and is sealingly attached to end wall 24 as best seen in FIG. 4. As seen in FIG. 2, the ferrule allows for the passage of wires 45 residing within a conduit 50 so as to pass into the electrical box 40. The ferrule 48 has an outer surface 52 which is dimensioned for receipt of conduit 50 as best seen in FIGS. 2 and 4.

The conduit fitting further includes a foam gasket 54 that is positioned within the open-ended chamber 46 adjacent end wall 24 as best seen in FIGS. 1 and 4. The foam gasket is preferably fabricated from a closed cell material. The gasket forms a liquidtight seal between end wall 24 and conduit 50 when the conduit 50 is inserted into the conduit fitting. As explained more fully below, the foam gasket has a thickness that allows compression thereof by end 51 of conduit 50, even if end 51 is uneven and/or is at a slanted, non-perpendicular angle relative to the longitudinal axis of the conduit.

As seen in FIGS. 1, 1A-1E, 2, 3 and 4, the liquidtight conduit fitting further includes a conduit locking device 56 having a flange 58 dimensioned for sealing attachment to flange 25 of body 22. This sealing engagement is best seen in FIG. 4. Flange 58 is typically sonically welded to flange 25 of body 22. Other forms of attachment, such as adhesives, could be used, as are well-known in the art. As seen in FIG. 1, flange 25 may have an energy director 29 formed therein with a triangular cross-sectional shape. As known in the ultrasonic welding art, an energy director 29 facilitates sonic welding of flange 25 to flange 58.

Figure 1A:
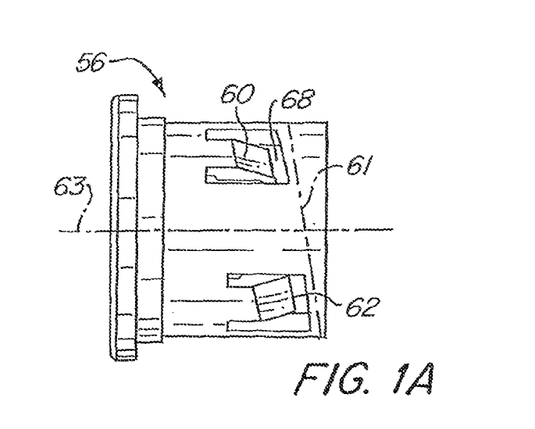
FIGS. 1A, 1B and 1C are side views of a conduit locking device of the conduit fitting, the side view of FIG. 1B rotated approximately 180 degrees relative to FIG. 1A and FIG. 1C oriented to fully show one cutout and tab.
Figure 1B:
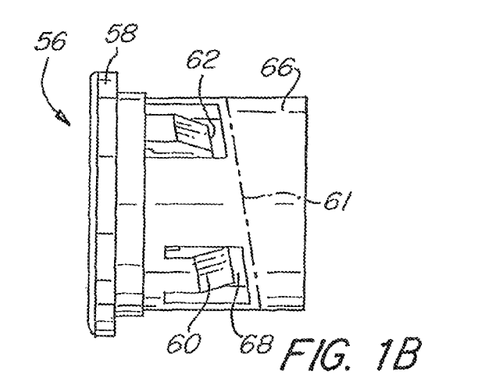

The conduit locking device includes a plurality of tabs 60 that extend inwardly as best seen in FIGS. 1, 1A-1E, 2, 3 and 5 so as to contact outer surface 53 of conduit 50 as conduit 50 is pushed on the conduit locking device (see arrows 63 of FIG. 2). As seen in FIG. 4, the tabs are resiliently attached to the conduit locking device so as to allow the terminating ends 62 of the tabs to flex radially outward into space 65 between outer shell 44 of body 22 and tab 60 (in its relaxed state) as conduit 50 is pushed onto the liquidtight conduit fitting 20. The tabs are preferably positioned on the conduit locking device so as to define a helix or helical-type pattern (see dotted line 61) in terms of their longitudinal position as shown by dotted axis 63 relative to the open-ended chamber 46. FIGS. 1A and 1B show the tabs forming this helical type pattern. Four tabs may be used although a different number of tabs may be used.

Figure 1C:
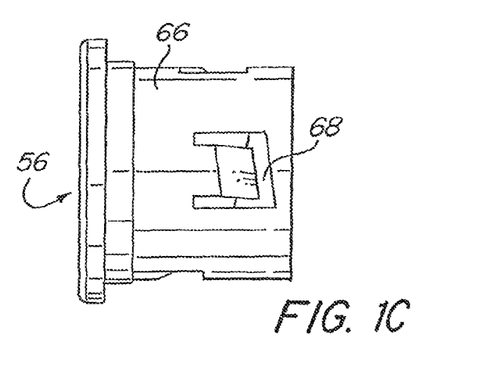
Figure 1D:
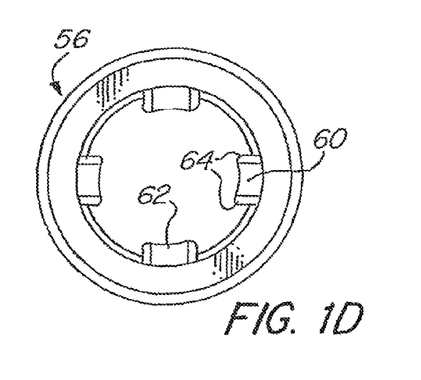
FIG. 1D is a front end view of the conduit locking device taken along line 1D-1D of FIG. 1.
Figure 1E:
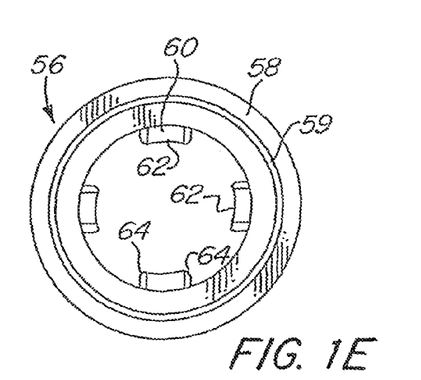
FIG. 1E is a rear end view of the locking device taken along line 1E-1E of FIG. 1.
Figure 6:
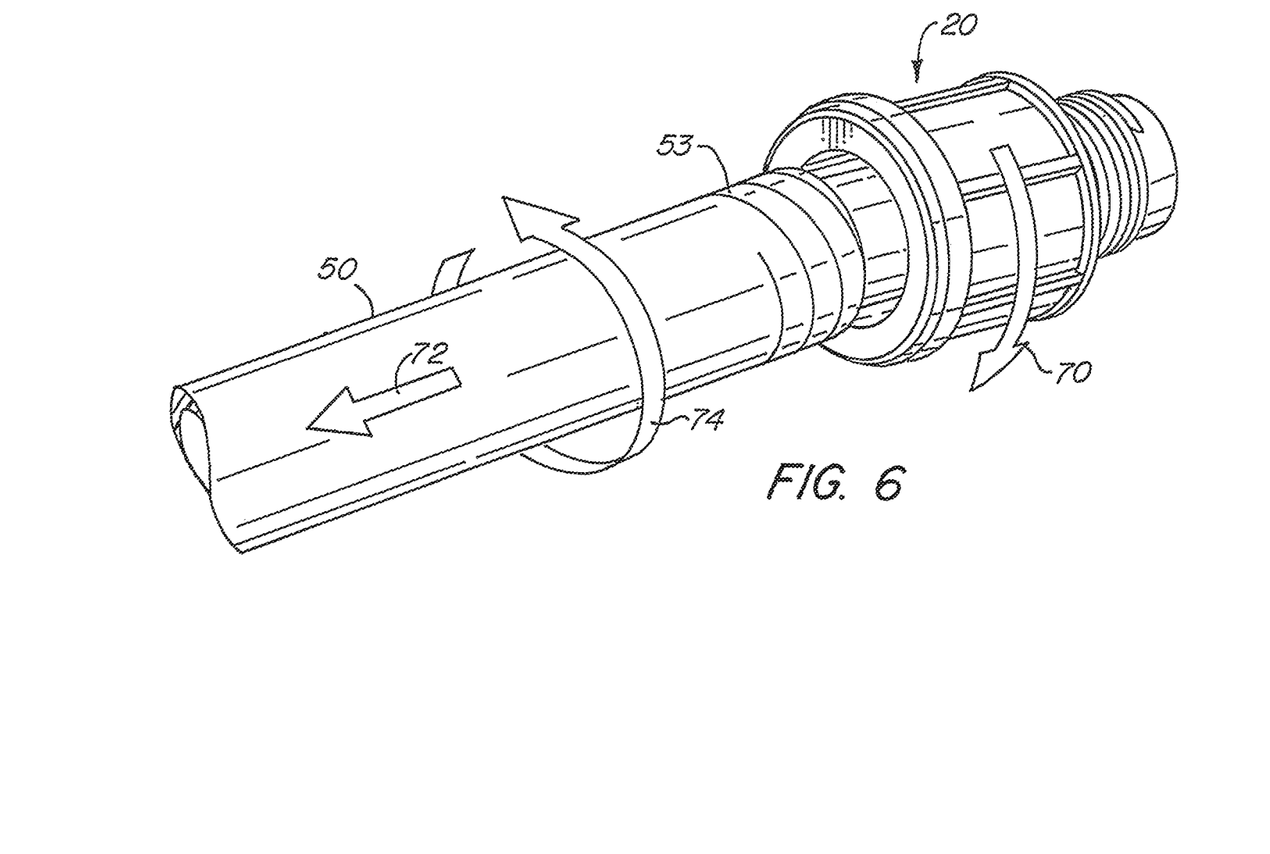
FIG. 6 is a perspective view of the liquidtight conduit fitting shown in FIG. 1, illustrating removal of an electrical conduit therefrom.
Figure 7:
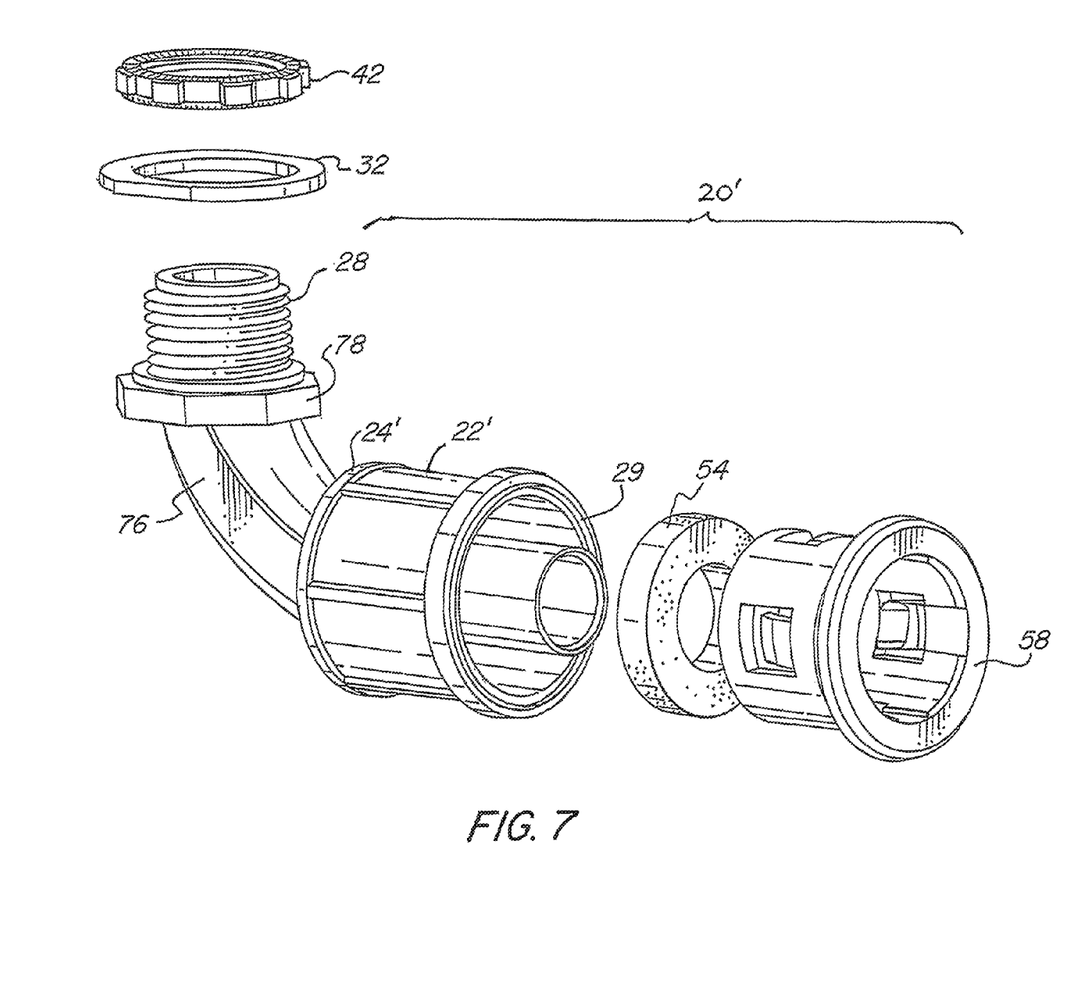
FIG. 7 is an exploded perspective view of a second embodiment of a liquidtight conduit having an elbow member.
Figures 8, 9:
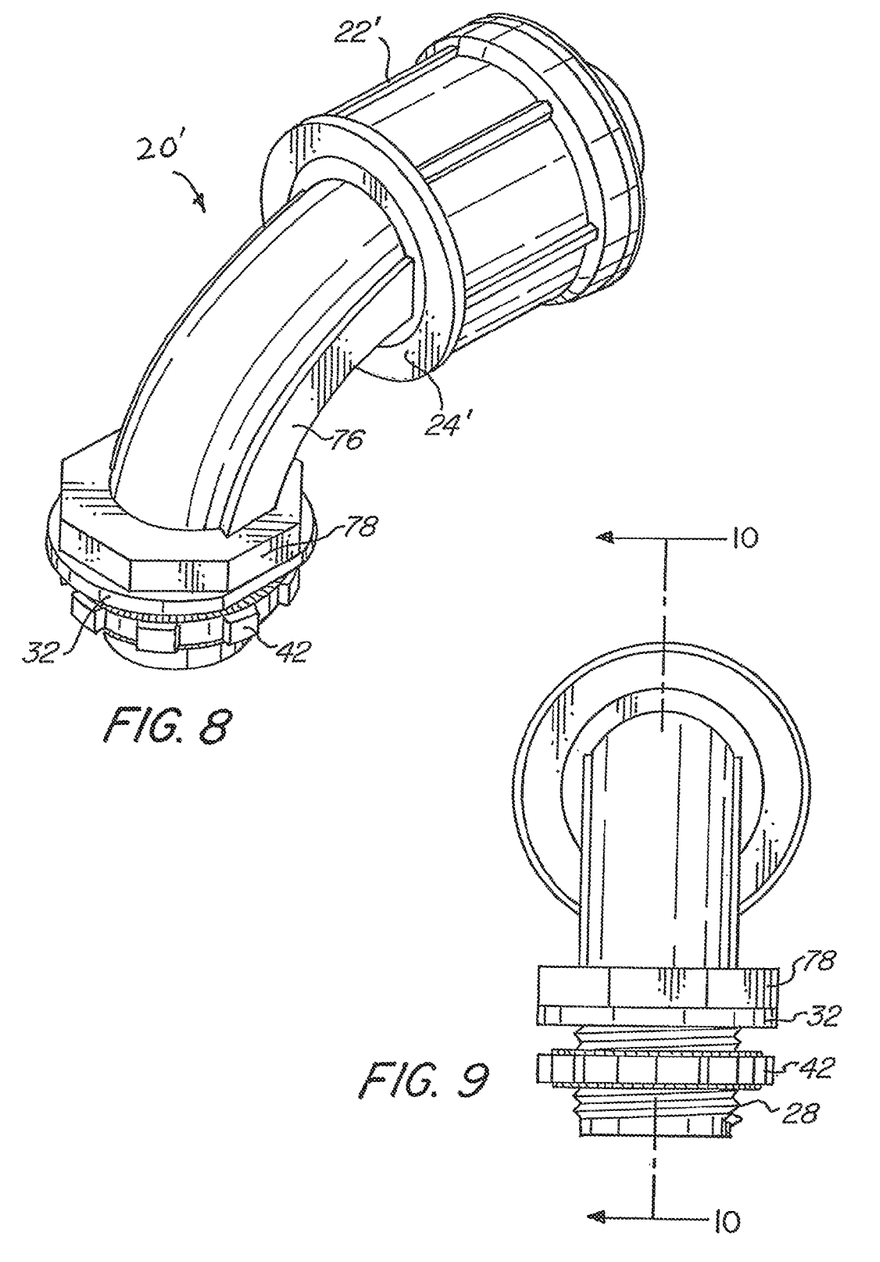
FIG. 8 is a perspective view of the liquidtight conduit fitting shown in FIG. 7 with the components attached together.
FIG. 9 is an end view of the conduit fitting shown in FIGS. 7-8.
Figure 10:
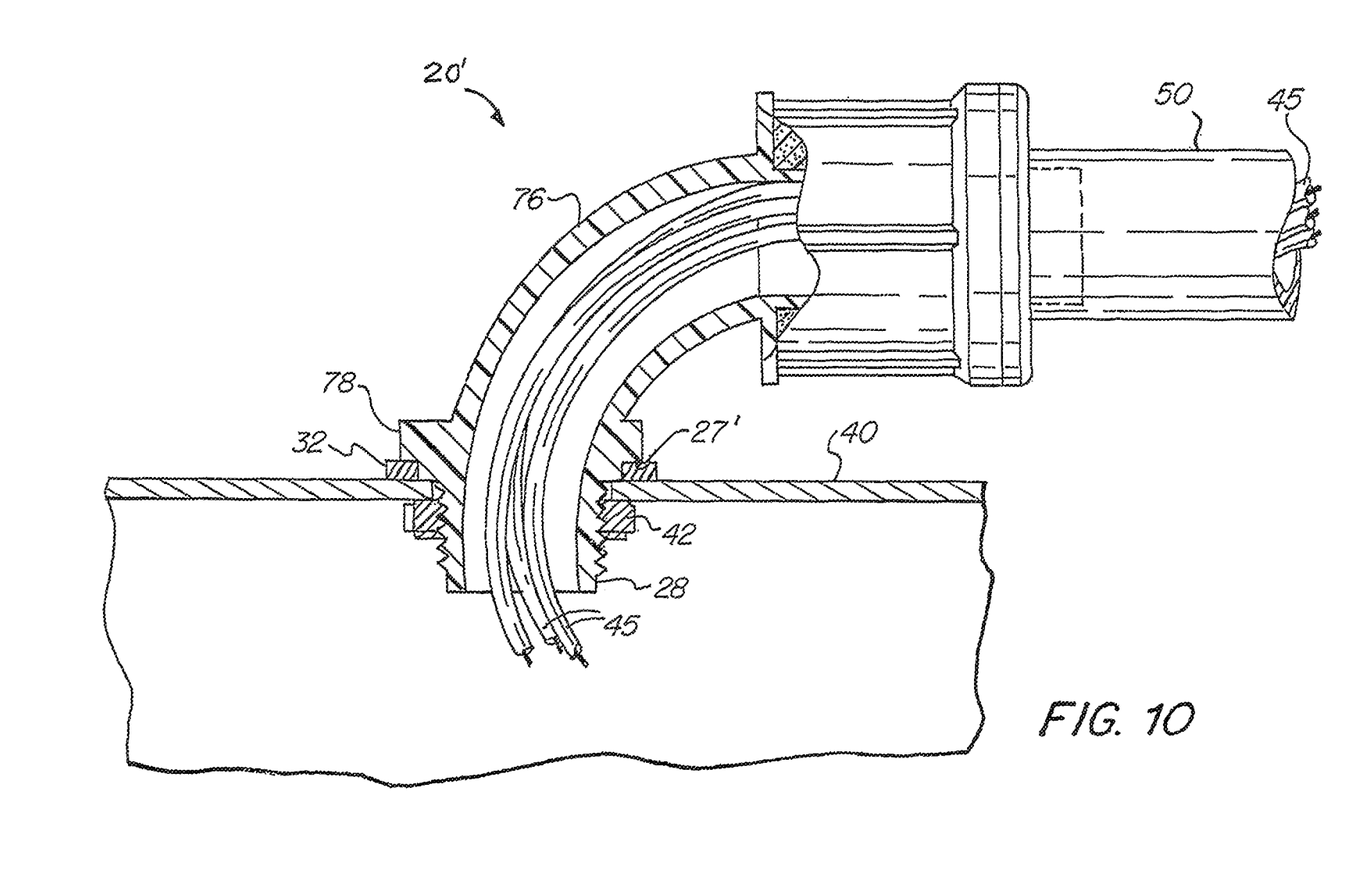
FIG. 10 is a cross-sectional view of the liquidtight conduit fitting taken along line 10-10 of FIG. 9, but showing the conduit fitting attached to an electrical box and with an electrical conduit secured to the fitting.

As best seen in FIGS. 1A-1E, the terminating end 62 of each tab 60 has relieved corners 64 with a radius of curvature which improves the ability of the conduit locking device to be unscrewed relative to a conduit positioned within the device (see FIG. 6). As seen in FIGS. 1A-1E, the remainder of each terminating end 62 between corners 64 have a sharp edge so as to bite into outer surface 53 of conduit 50. FIG. 4 illustrates this biting effect. This effect is enhanced when a user attempts to withdraw the conduit from the conduit locking device and thus the conduit remains firmly attached to the conduit locking device once inserted therein. The terminating ends also are preferably angled as shown in FIGS. 1A-1C so as to approximate the angle associated with the helical pattern of the tabs (see line 61 illustrating the helix angle).

As best seen in FIGS. 1A-1C, the tabs 60 are preferably secured to a cylindrical wall portion 66 of conduit locking device 56 in cutout regions 68 formed within the cylindrical wall portion 66.

Operation of the Liquidtight Conduit Fitting

FIG. 4 shows the liquidtight conduit fitting 20 securely affixed to electrical box 40 through an aperture 38 therein when a knockout (not shown) is removed from the electrical box. Conduit 50 is also shown securely connected to the conduit fitting 20. In operation, the conduit 50 is simply pressed downwardly as shown in FIG. 2.

Thus, FIG. 2 shows how conduit 50 is secured to liquidtight conduit fitting 20. Once wires 45 are passed through liquidtight conduit fitting 20, conduit 50 is merely pushed in the direction of arrows 63 into space 57 between conduit locking device 56 and ferrule 48 until it presses into gasket 54 thereby compressing the gasket at region 55 and forming a liquidtight seal (see FIG. 4). As discussed above and as seen in FIG. 4, once the conduit is inserted, terminating ends 62 of tabs 60 anchor the conduit within the liquidtight conduit fitting 20 by clamping into the outer surface 52 of conduit 50.

FIG. 6 illustrates removal of the conduit from the liquidtight conduit fitting. To do so, the liquidtight conduit fitting is typically uninstalled from the electrical box 40 (not shown in FIG. 6). Then, as shown by arrow 70, the liquidtight conduit fitting is rotated relative to conduit 50 so as to "unscrew" the conduit from the liquidtight conduit fitting due to the helical-type pattern of the tabs of the conduit locking device. The helical-type pattern of tabs 60 facilitates this "unscrewing" of the conduit from the liquidtight conduit fitting. Once removed from the conduit fitting, the conduit can be pulled away from the conduit fitting as shown by arrow 72.

Alternatively, the conduit could be allowed to rotate relative to the liquidtight conduit fitting as shown by arrow 74, but this is generally not practical in an installation where the conduit is affixed to some type of structure (not shown).

It should be noted that upon removal of the conduit from the liquidtight conduit fitting, foam gasket will substantially return to its uncompressed state. Therefore, the liquidtight conduit fitting can be used multiple times while still maintaining its liquidtight characteristics.

Other Features

The body 22 and conduit locking device 56 for the embodiment of the liquidtight conduit fitting described above is preferably fabricated from a thermoplastic, such as polyvinyl chloride (PVC) or nylon. This embodiment of the liquidtight conduit fitting is particularly suited for a Type B, non-metallic, flexible, liquidtight conduit. The foam gasket 54 is preferably a close-cell foam gasket formed from ethylene-propylene-diene-monomer (EPDM), or styrene-butadiene rubber (SPR), including a copolymer rubber, or from neoprene.

Second Embodiment

An alternative embodiment of a liquidtight conduit fitting 20' is shown in FIGS. 7-10. In this embodiment, the body 22' has an end wall 24' that is sealingly connected to a hollow elbow member 76. This elbow is typically a ninety degree elbow as seen in FIGS. 7-10. The hollow member 76 terminates at a flange 78. A nipple 28 is secured to the flange 78. Flange 78 includes a shoulder 27' similar to that of end wall 24 of the first embodiment. Locknut 42 and sealing washer 32 are the same as that for the previously discussed embodiment. The remaining portions of this liquidtight conduit fitting 20' are the same as those discussed above for the first embodiment of the liquidtight conduit fitting 20.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A liquidtight conduit fitting comprising:
 a body having an end wall with an opening formed therein;
 a hollow nipple attached to the end wall around said opening and extending from the end wall of the body, said nipple threaded for threaded engagement with a locknut and the nipple dimensioned for passage of a sealing washer so that the sealing washer can contact the end wall of the body, the nipple dimensioned for passage within an aperture of an electrical box and the end wall dimensioned for contacting a perimeter of the electrical box about said aperture,
 the body having an outer shell extending from said end wall in a direction opposite an extending direction of said nipple, the outer shell defining an open-ended chamber, the outer shell having a first end fixedly joined to said end wall and an opposing second end comprising a shell flange;
 a ferrule positioned within the outer shell, the ferrule attached to the end wall of the body on a side opposite said hollow nipple, the ferrule having an outer surface dimensioned for receipt of a conduit;
 a foam gasket positioned within the open-ended chamber adjacent the end wall and around the ferrule; and
 a conduit locking device comprising a device flange and a cylindrical wall portion, the shell flange of the outer shell positioned between the device flange and the end wall of the body, the device flange dimensioned for attachment to the shell flange of the outer shell and the cylindrical wall portion extending within the open-ended chamber, the conduit locking device having a plurality of tabs provided on the cylindrical wall portion, each tab protruding inwardly toward the outer surface of the ferrule so as to contact at a terminating end of the tab a conduit positioned around the ferrule, the terminating end of each tab positioned within the outer shell in a configuration that substantially defines a helix so that a conduit positioned around the ferrule and having an end thereof in sealing contact with the foam gasket is securely held in place by said tabs and so that the conduit can be removed from the conduit fitting by rotating the conduit fitting relative to said conduit.

2. The liquidtight conduit fitting according to claim 1, wherein the device flange of the conduit locking device is sonically welded to the shell flange of the outer shell of the body.

3. The liquidtight conduit fitting according to claim 1, wherein the body, nipple, ferrule and conduit locking device are fabricated from polyvinyl chloride.

4. The liquidtight conduit fitting according to claim 1, wherein the cylindrical wall portion depends from an end of the conduit locking device so as to extend within the open-ended chamber of the outer shell, the cylindrical wall portion including a plurality of cutouts, where each cutout has one of the plurality of tabs positioned therein.

5. The liquidtight conduit fitting according to claim a 4, wherein the plurality of tabs and the plurality of cutouts are each equal to four.

6. The liquidtight conduit fitting according to claim 5, wherein the plurality of tabs have terminating ends with corners that are relieved.

7. The liquidtight conduit fitting according to claim , wherein the plurality of tabs have terminating ends with corners that are relieved.

8. The liquidtight conduit fitting according to claim 7, wherein the terminating ends of the tabs are angled so as to substantially correspond to said helix.

9. The liquidtight conduit fitting according to claim 1, wherein the terminating ends of the tabs are angled so as to substantially correspond to said helix.

10. The liquidtight conduit fitting according to claim 1, wherein the end wall includes a shoulder dimensioned for receipt of the sealing washer so as to limit compression of the sealing washer when the locknut is tightened during installing of the conduit fitting through the aperture of the electrical box.

11. The liquidtight conduit fitting according to claim 1, wherein the outer surface of the ferrule is dimensioned for receipt of a liquidtight non-metallic flexible electrical conduit.

12. A liquidtight conduit fitting comprising:
a body having an end wall with an opening formed therein;
the body having an outer shell extending from said end wall, the outer shell defining an open-ended chamber, the outer shell having a first end fixedly joined to said end wall and an opposing second end comprising a shell flange;
a ferrule positioned within the outer shell and attached to the end wall of the body, the ferrule having an outer surface dimensioned for receipt of a conduit;
a foam gasket positioned within the open-ended chamber adjacent the end wall and around the ferrule;
a hollow nipple attached to a flange, wherein the flange is dimensioned for contacting a perimeter of the electrical box about an aperture of the electrical box, said nipple threaded for threaded engagement with a locknut and the nipple dimensioned for passage of a sealing washer;
a hollow elbow member sealingly attached at one end to the flange and sealingly attached to the end wall at a second end of the elbow; and
a conduit locking device comprising a device flange and a cylindrical wall portion, the shell flange of the outer shell positioned between the device flange and the end wall of the body, the device flange dimensioned for attachment to the shell flange of the outer shell and the cylindrical wall portion extending within the open-ended chamber, the conduit locking device having a plurality of tabs provided on the cylindrical wall portion, each tabs protruding inwardly toward the outer surface of the ferrule so as to contact at a terminating end of the tab a conduit positioned around the ferrule, the terminating end of each tab positioned within the outer shell in a configuration that substantially defines a helix so that a conduit positioned around the ferrule and having an end thereof in sealing contact with the foam gasket is securely held in place by said tabs and so that the conduit can be removed from the conduit fitting by rotating the conduit fitting relative to said conduit.

13. The liquidtight conduit fitting according to claim 12, wherein the device flange of the conduit locking device is sonically welded to the shell flange of the outer shell of the body.

14. The liquidtight conduit fitting according to claim 12, wherein the body, nipple, ferrule, elbow member and conduit locking device are fabricated from polyvinyl chloride.

15. The liquidtight conduit fitting according to claim 12, wherein the cylindrical wall portion depends from an end of the conduit locking device so as to extend within the open-ended chamber of the outer shell, the cylindrical wall portion including a plurality of cutouts where each cutout has one of the plurality of tabs positioned therein.

16. The liquidtight conduit fitting according to claim 15, wherein the plurality of tabs and the plurality of cutouts are each equal to four.

17. The liquidtight conduit fitting according to claim 16, wherein the plurality of tabs have terminating ends with corners that are relieved.

18. The liquidtight conduit fitting according to claim 17, wherein the terminating ends of the tabs are angled so as to substantially correspond to said helix.

19. The liquidtight conduit fitting according to claim 12, wherein the terminating ends of the tabs are angled so as to substantially correspond to said helix.

20. The liquidtight conduit fitting according to claim 12, wherein the plurality of tabs have terminating ends with corners that are relieved.

21. The liquidtight conduit fitting according to claim 12, wherein the flange includes a shoulder dimensioned for receipt of the sealing washer so as to limit compression of the sealing washer when the locknut is tightened during installing of the conduit fitting through the aperture of the electrical box.

22. The liquidtight conduit fitting according to claim 12, wherein the outer surface of the ferrule is dimensioned for receipt of a liquidtight non-metallic flexible electrical conduit.

23. A liquidtight conduit fitting comprising:
a body having an end wall with an opening formed therein;
a hollow nipple attached to the end wall around said opening and extending from the end wall of the body, said nipple threaded for threaded engagement with a locknut and the nipple dimensioned for passage of a sealing washer so that the sealing washer can contact the end wall of the body, the nipple dimensioned for passage within an aperture of an electrical box and the end wall dimensioned for contacting a perimeter of the electrical box about said aperture, the body having an outer shell extending from said end wall in a direction opposite an extending direction of said nipple, the outer shell defining an open-ended chamber, the outer shell having a first end fixedly joined to said end wall and an opposing second end comprising a shell flange;

a ferrule positioned within the outer shell, the ferrule attached to the end wall of the body on a side opposite said hollow nipple, the ferrule having an outer surface dimensioned for receipt of a conduit;

a foam gasket positioned within the open-ended chamber adjacent the end wall and around the ferrule; and a conduit locking device comprising a device flange and a cylindrical wall portion, the shell flange of the outer shell positioned between the device flange and the end wall of the body, the device flange dimensioned for attachment to the shell flange of the outer shell and the cylindrical wall portion extending within the open-ended chamber, the cylindrical wall portion depending from the device flange so as to extend within the open-ended chamber of the outer shell, the cylindrical wall including a plurality of cutouts, and a plurality of tabs each positioned within one of the cutouts, each tab protruding inwardly toward the outer surface of the ferrule so as to contact at a terminating end of the tab a conduit positioned around the ferrule, the terminating end of each tab positioned within the outer shell in a configuration that substantially defines a helix so that a conduit positioned around the ferrule and having an end thereof in sealing contact with the foam gasket is securely held in place by said tabs and so that the conduit can be removed from the conduit fitting by rotating the conduit fitting relative to said conduit.

24. The liquidtight conduit fitting according to claim 23, wherein the device flange of the conduit locking device is sonically welded to the shell flange of the outer shell of the body.

25. The liquidtight conduit fitting according to claim 23, wherein the body, nipple, ferrule and conduit locking device are fabricated from polyvinyl chloride.

26. The liquidtight conduit fitting according to claim 23, wherein the plurality of tabs and the plurality of cutouts are each equal to four.

27. The liquidtight conduit fitting according to claim 26, wherein the plurality of tabs have terminating ends with corners that are relieved.

28. The liquidtight conduit fitting according to claim 23, wherein the plurality of tabs have terminating ends with corners that are relieved.

29. The liquidtight conduit fitting according to claim 23, wherein the terminating ends of the tabs are angled so as to substantially correspond to said helix.

30. The liquidtight conduit fitting according to claim 23, wherein the end wall includes a shoulder dimensioned for receipt of the sealing washer so as to limit compression of the sealing washer when the locknut is tightened during installing of the conduit fitting through the aperture of the electrical box.

31. The liquidtight conduit fitting according to claim 23, wherein the hollow nipple is attached to a flange, wherein the flange that the nipple is attached to is dimensioned for contacting the perimeter of the electrical box about said aperture, and wherein the liquidtight conduit fitting further comprises a hollow elbow member sealingly attached at one end to the flange and sealingly attached to the end wall at a second end of the elbow.

32. The liquidtight conduit fitting according to claim 23, wherein the outer surface of the ferrule is dimensioned for receipt of a liquidtight non-metallic flexible electrical conduit.

* * * * *